Patented Nov. 12, 1929.

1,735,555

UNITED STATES PATENT OFFICE

GERALD L. WENDT AND CLIFFORD BANTA, OF CHICAGO, ILLINOIS, ASSIGNORS TO STANDARD OIL COMPANY, OF WHITING, INDIANA, A CORPORATION OF INDIANA

MANUFACTURE OF A CERESINE-LIKE WAX

No Drawing.　　　Application filed March 2, 1923. Serial No. 622,438.

The present invention relates to the manufacture of a ceresine-like wax from crude petroleum and will be fully understood from the following description thereof.

In carrying out the present invention, a crude petroleum may suitably be reduced to a bottom or residuum, for example, by steam distillation, so that substantially no cracking of the residue or bottom takes place. The viscous bottom so produced, which should have, for example, a flash point of 500° F. or higher, preferably after suitable acid treatment, is then treated for the removal of its wax content. This may suitably be effected, for example, by admixing with the residuum at least an equal part of a light petroleum distillate, or other suitable solvent, for example, a distillate of the character of cleaners' naphtha having a narrow range of boiling points within the gasoline boiling point range, chilling the diluted oil, thereby precipitating the waxy material and removing it by gravity or centrifugal separation.

The waxy material thus separated may then be further treated by repeated solution in naphtha, chilling and separation of precipitated waxy material until an unctuous waxy mass of a melting point of 130° or higher is obtained. During this procedure, if desired, the wax solution may be subjected to filtration through fuller's earth or other suitable absorbent material in order to remove coloring matter therefrom, this filtration being carried out with the wax while in solution in the naphtha. The unctuous waxy material is then, in accordance with the present invention, dissolved in a mixed solvent consisting of a liquid in which the waxy material is soluble, and a non-solvent liquid miscible with the solvent liquid. The proportion of non-solvent liquid admixed with the solvent liquid is adjusted so as to permit the solution of the wax at moderately elevated temperatures, for example, at temperatures of 100 to 150° F., and to cause its precipitation at moderately low temperature, for example, 25 to 40° F. As a solvent liquid, benzol, toluol, xylol, chloroform or the like may be employed, and as a non-solvent miscible liquid, ethyl alcohol (hereinafter designated as alcohol), isopropyl alcohol, ethylene dichloride or the like may be employed. With a liquid mixture containing two parts of xylol and one part of alcohol, complete solution of the waxy material may be effected at approximately 130° F. and substantially complete precipitation thereof takes place somewhat above the freezing point of water, so that chilling the solution to about 30° F. effects precipitation of the wax.

The waxy mass obtained as already described is dissolved in a solvent liquid of the character described, about a 5 to 10 per cent solution being prepared. This solution is then chilled to the temperature determined by the proportion of non-solvent liquid, that is in the case of the specific solvent mixture described, to about 30° F., at which temperature the wax is precipitated in comparatively coarse crystalline form and may be removed by filtration, for example, in a filter press.

The wax thus removed may, if desired, be subjected to repeated treatment one or more times, or until its melting point shows no increase on further treatment of a test sample thereof. A ceresine-like wax material having a melting point of 167° F. and higher has been obtained in the manner described, such wax having a creamy color and a somewhat brittle fracture.

In the foregoing, the invention has been particularly described in connection with the treatment of waxy material already separated in relatively pure form from crude petroleum. If desired, a solvent mixture having the described characteristics may be employed in the treatment of the crude petroleum residue for the original separation of the wax therefrom. For example, the crude residue from the non-cracking distillation may be mixed with at least an equal volume of solvent mixture, for example, the alcohol-xylol mixture already described, and preferably with about two volumes thereof, and the mixture chilled for the precipitation of the wax. The wax is precipitated under these conditions in a form which permits filtration, and consequently the removal of the wax from the oil may then be effected by filter pressing, centrifugal filtration, or other filtering methods.

After its removal from the crude oil residuum, the further treatment of the waxy material may be effected entirely with the solvent mixture described, or in the initial stages with naphtha and subsequently with the solvent material. The precise procedure employed will be determined, of course, by plant conditions and by cost of materials to a very large extent.

We claim:

1. The method of separating ceresine-like wax from substantially uncracked crude petroleum residuum, which comprises diluting the crude oil residuum with a mixture of a wax solvent liquid and a non-solvent liquid miscible therewith, cooling the mixture to effect precipitation of the wax, and separating the precipitated wax.

2. The method of removing ceresine-like waxy material from substantially uncracked crude petroleum residuum, which consists in diluting the crude petroleum residuum with a mixture of a wax solvent liquid and a non-solvent liquid miscible therewith, cooling the mixture to precipitate the wax, and filtering the wax from the liquid.

3. The method of removing ceresine-like waxy material from substantially uncracked crude petroleum residuum, which consists in diluting the residuum with a mixture of alcohol and xylol, chilling the diluted oil to precipitate the wax therefrom, and filtering the wax from the diluted oil.

4. The method of producing a ceresine-like wax which consists in removing waxy material from substantially uncracked crude petroleum residuum, dissolving the waxy material in a solvent liquid admixed with a miscible non-solvent liquid, cooling the mixture thereby precipitating the wax, and separating the precipitated wax.

5. The method of producing ceresine-like wax from crude petroleum, which consists in removing waxy material from a substantially uncracked crude petroleum residue, dissolving the waxy material in a mixture of xylol and alcohol, chilling the solution to precipitate the wax therefrom and separating the wax.

6. The method of producing a ceresine-like wax from crude petroleum, which consists in removing waxy material from a substantially uncracked crude petroleum residue, dissolving the waxy material to the extent of about 10 per cent of wax in a mixture of two parts xylol to one part alcohol, chilling the solution and filtering the wax therefrom.

GERALD L. WENDT.
CLIFFORD BANTA.